United States Patent
Ambrazas et al.

(10) Patent No.: US 6,561,152 B2
(45) Date of Patent: May 13, 2003

(54) OPTICAL TEST ENGINE, IN PARTICULAR FOR COMBUSTION PARAMETERS MEASUREMENTS

(75) Inventors: Didier Ambrazas, Antony (FR); Thierry Baritaud, Rueil Malmaison (FR); Jean-Francois Le Coz, Nanterre (FR); Patrice Lessart, Sartrouville (FR); Stéphane Meder, Chatenay Malabry (FR); Fabrice Cedrone, Rueil Malmaison (FR)

(73) Assignee: Institut Francais du Petrole, Rueil-Malmaison Cedex (FR)

( * ) Notice: Subject to any disclaimer, the term of this patent is extended or adjusted under 35 U.S.C. 154(b) by 101 days.

(21) Appl. No.: 09/910,806

(22) Filed: Jul. 24, 2001

(65) Prior Publication Data

US 2002/0029622 A1 Mar. 14, 2002

(30) Foreign Application Priority Data

Jul. 28, 2000 (FR) .............................. 00 10023

(51) Int. Cl.[7] .................................. F02F 1/00

(52) U.S. Cl. .................................. 123/193.2; 123/193.3
(58) Field of Search .......................... 123/193.5, 193.3, 123/193.2, 193.1

(56) References Cited

U.S. PATENT DOCUMENTS

| 2,919,688 A | * | 1/1960 | Bowditch et al. | ........ 123/193.2 |
| 3,698,370 A | | 10/1972 | Haldeman et al. | |
| RE30,253 E | * | 4/1980 | Haldeman et al. | ........ 123/193.3 |
| 6,158,406 A | * | 12/2000 | Sunnarborg | .............. 123/193.2 |

* cited by examiner

Primary Examiner—Marguerite McMahon
(74) Attorney, Agent, or Firm—Antonelli, Terry, Stout & Kraus, LLP

(57) ABSTRACT

The present invention relates to an optical engine comprising a cylinder head of an industrial engine and a transparent cylinder. According to the invention, the transparent cylinder is tightly applied to the cylinder head by pneumatic means, a jack for example, allowing easy dismantling and cleaning of the cylinder. Furthermore, the industrial cylinder head is mounted on a support secured to the frame of the <<engine bottom>> by jacks or equivalent means, at least one of these means being pneumatic for opening the engine.

5 Claims, 2 Drawing Sheets

OPTICAL TEST ENGINE, IN PARTICULAR FOR COMBUSTION PARAMETERS MEASUREMENTS

FIELD OF THE INVENTION

The present invention relates to a single-cylinder engine suited for optical measurements on the parameters of the combustion that takes place in the chamber provided by a cylinder head, a transparent cylinder and a piston.

This type of engine is of great interest for visualizing what takes place in a combustion chamber of an engine, considering the fuel supply means, the exhaust means, the type of fuel, the engine load, or other parameters affecting the running conditions of the combustion engine. The ignition mode of the fuel can in particular be observed on a real-time basis.

BACKGROUND OF THE INVENTION

Test engines equipped with cylinders having portholes made of a transparent material for visual observation are already known, but they notably present the drawback of being fragile, with mounting, seal difficulties, problems of adaptability to different types of cylinder head, difficulties in cleaning the observation means that are quickly covered with carbon deposits due to combustion.

SUMMARY OF THE INVENTION

The present invention provides advantageous solutions in relation to the prior art and thus relates to an optical test engine comprising a cylinder made of a transparent material, a piston cooperating with the cylinder, a cylinder head on top of the cylinder so as to form a sealed combustion chamber. The cylinder is applied to the plane of the cylinder head by an annular jack whose travel allows access to the inside of said chamber and the cylinder head is secured to a frame by means of a support mounted on four columns consisting of guides that slide longitudinally.

The annular jack can be pneumatic.

The columns can comprise a rod guided by balls, or equivalent means.

The travel of the columns and the travel of the annular jack can be determined to allow dismantling of the cylinder and of the piston.

The cylinder head can be a cylinder head of an industrial engine, fastened to the support.

BRIEF DESCRIPTION OF THE FIGURES

Other features and advantages of the present invention will be clear from reading the description hereafter of a non limitative example, with reference to the accompanying drawings wherein.

DETAILED DESCRIPTION

Figure 1:
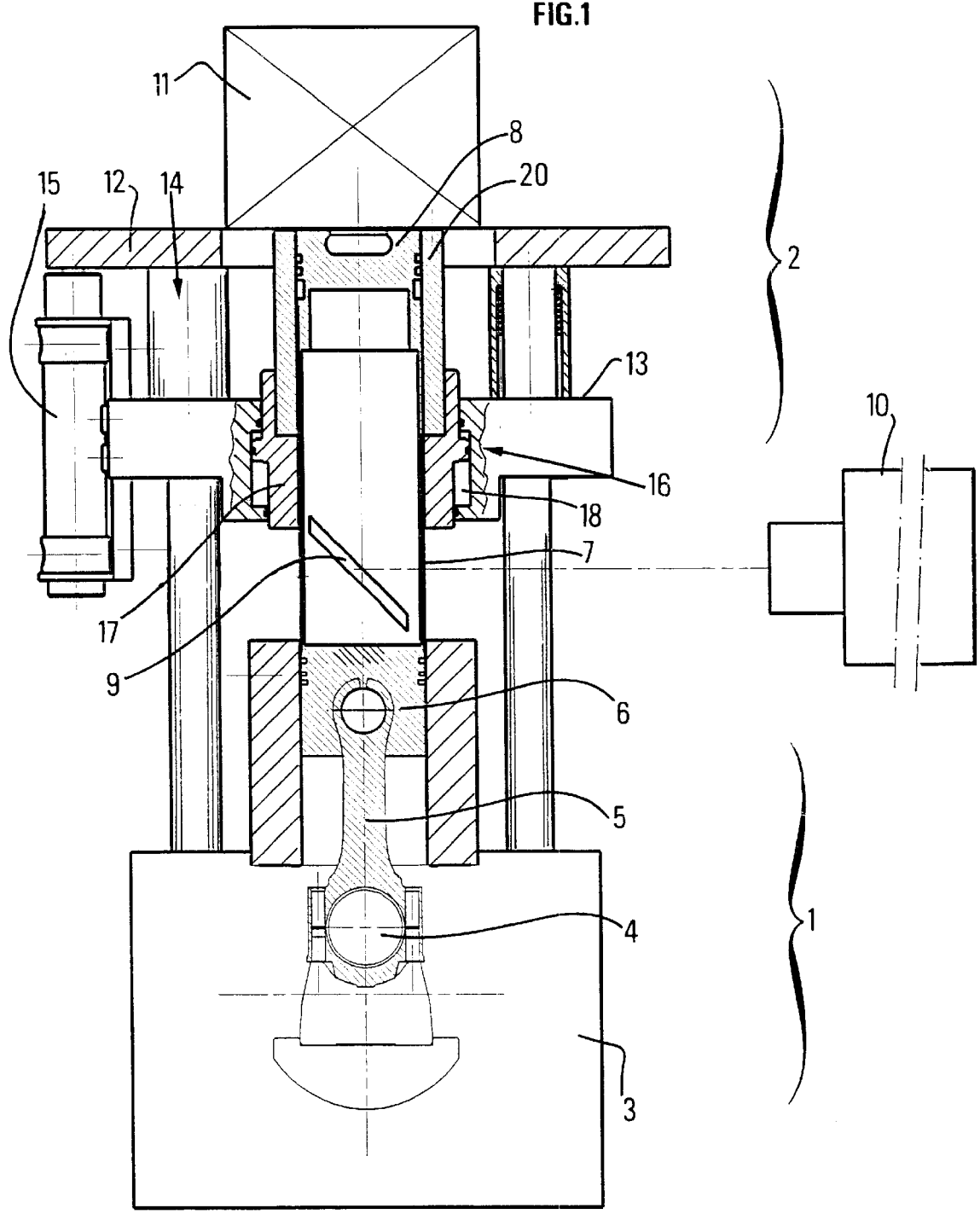
FIG. 1 diagrammatically shows, in cross-sectional view, the optical engine according to the invention, in running position.

In FIG. 1, reference number 1 refers to an assembly referred to as <<engine bottom>> and reference number 2 refers to an assembly consisting of the cylinder head and the combustion chamber.

The <<engine bottom>> assembly is conventional and comprises a crankcase 3 wherein a crankshaft 4 is connected to a connecting rod 5 and to a crosshead 6 subjected to a reciprocating motion. A device intended to drive and/or to brake the rotation of the crankshaft is not shown here since it is of conventional design and known to the man skilled in the art. Crosshead 6 is extended by a crosspiece 7 at the end of which a piston 8 is fastened. The crosspiece is manufactured in such a way that a mirror 9 can be arranged in line with piston 8 so that an observation means 10, a camera for example, visualizes and/or records, through a transparent wall of piston 8, the phenomena that take place within the combustion chamber.

Assembly 2 consists of a cylinder head diagrammatically represented by element 11. What is referred to as a cylinder head here is all the means that define a combustion chamber, supply and exhaust ports, corresponding supply and exhaust means: valves, injection means, etc. This assembly also comprises the valve mechanization means, camshafts or equivalent means. The means for driving the camshaft are not shown here, but they are known to the man skilled in the art.

The cylinder head is fastened to a support 12, for example a sufficiently stiff metal plate. Support 12 is connected to <<engine bottom>> 1, and more precisely to upper frame 13, by columns 14, preferably four, determined to be stiff enough laterally while allowing vertical longitudinal sliding for lifting the cylinder head in relation to the transparent cylinder. These four columns can comprise ball guides that limit the side play while allowing a longitudinal travel that can range, for example, between 5 and 20 cm.

In order to move cylinder head 11 on its support 12 by means of guides 14, at least one pneumatic jack 15 is fastened to frame 13, the rod being fastened to support 12. Of course, said columns 14 are immobilized by locking means when the engine is running (engine closed). Quick locking and unlocking means are preferably used so as to allow fast opening of the engine by means of pneumatic jack 15. Long-thread screws and nuts cooperating with split crosspieces can for example be used, which can thus be removed without requiring complete removal of the nut. Other quick fastening means can also be used without departing from the scope of the present invention. Hydraulic jacks maintained locked under pressure can be used.

Frame 13 comprises a special layout receiving a pneumatic jack 16. An annular part 17 forms a piston that moves towards the cylinder head by applying a pressure, preferably pneumatic, in chamber 18. The upper part of annular piston 17 is machined to receive the base of a cylinder 20 made of a transparent material quartz for example.

Figure 2:
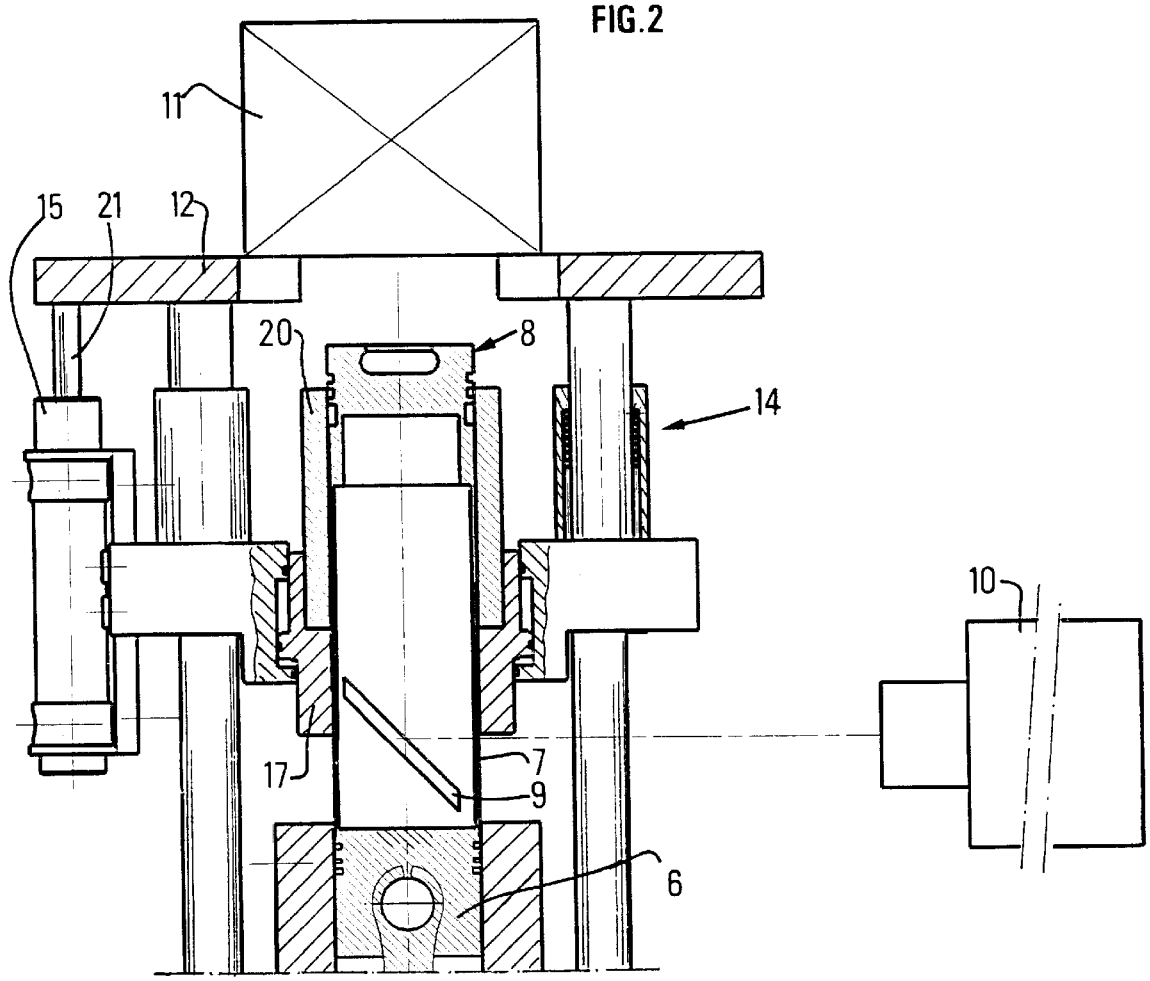
FIG. 2 shows, also in cross-sectional view, the same engine in <<open>> position allowing access to the cylinder and/or to the piston.

FIG. 2 shows the same section as in FIG. 1, but the engine is <<open>>, thus allowing access to piston 8, to transparent cylinder 20 and to the lower plane of cylinder head 11. There are two displacements that complement one another and add up: the recoil of annular piston 17 that supports transparent cylinder 20, the lift of the cylinder head through displacement of its support 12 after unlocking jacks 14, the actuation of pneumatic jack 15 and the coming out of rod 21.

Figure 3:
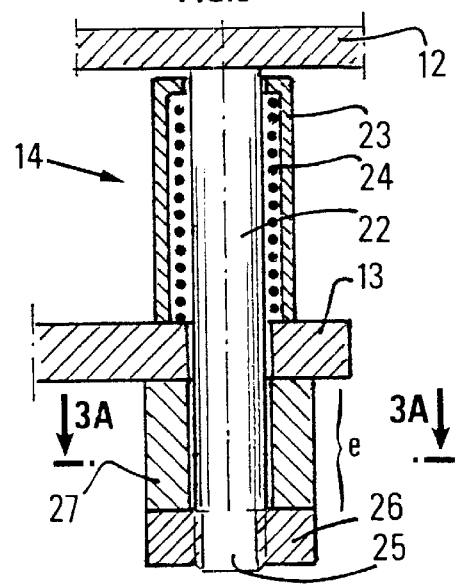
FIGS. 3 and 3A illustrate a system intended for quick locking of the cylinder head.

FIG. 3 shows an example of quick fastening of the cylinder head and of support 12 to frame 13 of the <<engine bottom>>. Column 14 consists of a rod 22 fastened to support plate 12 and a cylinder fastened to frame 13. An assembly of bearing means 24, ball bearing for example, allows longitudinal displacement with a minimum side play.

Figure 3A:
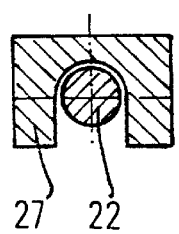

Rod 22 runs through frame 13 and is ended by a thread 25 for locking by means of a nut 26. A crosspiece 27 of length l allows, after its has been removed, support 12 to be moved away from frame 13 by a distance at most equal to l. FIG. 3A is a cross-sectional view of crosspiece 27 and rod 22. The U shape of the crosspiece allows, as soon as nut 25 is unlocked, removal by lateral displacement and the cylinder head can be freely moved away from the frame, and the engine can thus be opened.

It is thus clear that the present optical engine can be (partly) opened immediately simply by actuating pneumatic jack 17. It is thus possible to have access to the inside of the cylinder in order to clean it and to continue optical observations through the transparent cylinder.

Another important advantage, due to the structure of the present engine, is the fact that a cylinder head of an industrial engine can be used practically directly. In fact, the adjustment possibility provided by the column mounting of the plate supporting the cylinder head does not require design and manufacture of a mounting specific to each type of cylinder head (or even manufacture of a special test cylinder head). In the case of a multi-cylinder engine, the present optical engine is mounted on the location of one of the combustion chambers, the various cooling, intake and exhaust pipes that communicate with the other three cylinder heads being sealed so that the industrial cylinder head is independent and usable on a single-cylinder basis by cooperating with the transparent single cylinder.

Other advantages of the present invention can be mentioned:

easy replacement of the cylinder, good control of the bearing area of the cylinder on the joint plane of the cylinder head for sealing by means of the pneumatic annular jack, adaptability to different types of cylinder head, easy replacement of the lower and upper piston, great rigidity of the assembly provided by the columns with ball guides, adaptability of this engine to differents types of bore and travel, it is not necessary to dismantle the flexible hoses of the cylinder head cooling and lubrication systems to <<open>> the engine according to the invention.

What is claimed is:

1. An optical test engine comprising a cylinder (20) made of a transparent material, a piston (8) cooperating with said cylinder, a cylinder head (11) containing said cylinder so as to form a sealed combustion chamber, characterized in that said cylinder is applied to the plane of said cylinder head by an annular jack (17) whose travel allows access to the inside of said chamber and in that said cylinder head is secured to a frame by means of a support (12) mounted on four columns (14) consisting of guides that slide longitudinally.

2. An engine as claimed in claim 1, wherein said annular jack is pneumatic.

3. An engine as claimed in claim 1, wherein said columns comprise a rod guided by balls.

4. An engine as claimed in claim 1, wherein the travel of said columns and the travel of said annular jack are determined to allow dismantling of the cylinder and of the piston.

5. An engine as claimed in claim 1, wherein said cylinder head is a cylinder head of an industrial engine fastened to said support.

* * * * *